United States Patent
Renshaw

Patent Number: 5,852,237
Date of Patent: Dec. 22, 1998

[54] APPARATUS AND METHOD FOR MEASURING THE SIDE SLIP OF A LOW OBSERVABLE AIRCRAFT

[75] Inventor: Kevin J. Renshaw, Fort Worth, Tex.

[73] Assignee: Lockheed Martin Corporation, Fort Worth, Tex.

[21] Appl. No.: 864,652

[22] Filed: May 28, 1997

[51] Int. Cl.$^6$ .................................................. G01C 21/00
[52] U.S. Cl. ..................... 73/180; 73/170.02; 73/170.05; 340/968
[58] Field of Search ............................... 73/180, 179, 186, 73/170.02, 170.05; 340/967, 968; 244/82

[56] References Cited

U.S. PATENT DOCUMENTS

| | | | |
|---|---|---|---|
| 3,079,105 | 2/1963 | Raspet | 244/1 |
| 3,940,093 | 2/1976 | Cabriere | 244/42 A |
| 4,212,199 | 7/1980 | Bikle et al. | 73/180 X |
| 4,230,290 | 10/1980 | Townsend et al. | 244/1 R |
| 4,567,760 | 2/1986 | Crowder | 73/188 |
| 4,814,764 | 3/1989 | Middleton | 340/967 |
| 4,981,038 | 1/1991 | Torres et al. | 73/182 |
| 5,115,237 | 5/1992 | Greene | 340/967 |
| 5,209,430 | 5/1993 | Wilson et al. | 244/17.19 |
| 5,442,958 | 8/1995 | Hagen | 73/170.02 |
| 5,564,652 | 10/1996 | Trimbath | 244/75 R |

*Primary Examiner*—Joseph L. Felber
*Attorney, Agent, or Firm*—Baker & Botts, L.L.P.

[57] ABSTRACT

An apparatus and method for measuring airflow past an aircraft by extending a probe (14) from the aircraft into the airflow with a retraction-extension mechanism (20) when a measurement is desired, and retracting the probe (14) when a measurement is not desired. In a low observable aircraft (12), the probe (14) can extend to measure angle of sideslip for flight in a slow speed regime, such as is experienced in vertical take-offs and landings, and can retract during normal wing borne flight to reduce the aircraft's radar signature.

20 Claims, 2 Drawing Sheets

APPARATUS AND METHOD FOR MEASURING THE SIDE SLIP OF A LOW OBSERVABLE AIRCRAFT

TECHNICAL FIELD OF THE INVENTION

This invention relates in general to the field of determining an aircraft's flight path and more particularly to determining the angle of sideslip of a low observable aircraft during slow speed flight.

BACKGROUND OF THE INVENTION

Fixed wing aircraft fly by producing lift from airflow passing over wings. The airflow is usually produced when engines, such as jet engines, produce thrust to force the aircraft along a flight path. Wings, which can be formed in various air foil shapes, extend from the aircraft in a direction generally perpendicular to the flight path of the aircraft and produce lift along a lift axis by creating a pressure differential between the top and bottom of the air foil. When the lift generated by the air foil becomes greater than the weight of the aircraft, the aircraft is capable of sustaining normal wing borne flight. When the airflow is not adequate to produce lift in excess of the aircraft's weight, the aircraft cannot sustain normal wing borne flight.

Modern jet aircraft must generally travel at speeds in excess of 100 knots before their wings can create enough lift to sustain normal wing borne flight. Thus, to take off or land, modern jet aircraft need a runway long enough to transition to and from flying speed. In some situations, however, it is desirable that an aircraft take off or land without a runway. The aircraft can use jet lift, which means flying with a vertical lifting system, to allow it to accelerate or decelerate above ground level. An aircraft can sustain flight below normal flying speeds by supplementing the lift normally produced by the wings with jet lift, which is produced by redirecting thrust from the jet engine along the lift axis.

One aircraft capable of performing vertical takeoffs and landings is the AV-8B Harrier. During a vertical takeoff, the Harrier enters a slow speed flight regime by directing thrust in excess of its weight along its lift axis. As the aircraft climbs to a safe altitude, the pilot can gradually redirect the thrust from the lift vector to the longitudinal thrust vector to push the aircraft forward and create an airflow over the wings. When the airflow over the wings produces lift in excess of the weight of the aircraft, the aircraft leaves the slow speed flight regime and enters normal wing borne flight. During vertical landings, the pilot transitions from normal wing borne flight by slowing the aircraft below its stall speed and simultaneously redirecting thrust along the lift axis to maintain the aircraft's altitude. In the slow speed flight regime, the pilot can adjust the altitude of the aircraft by altering the thrust along the lift vector and can thus lower the aircraft vertically to a safe landing. During takeoffs and landings, the pilot can steer the aircraft relative to the wind and the ground by varying the pitch, yaw and roll of the aircraft with inputs from the flight controls or with thrust redirected along the pitch axis, yaw axis or roll axis of the aircraft.

In the slow speed flight regime, the airflow over the aircraft can become less predictable. For instance, variations in the wind caused by gusts or ground obstructions can change the airflow over the aircraft relative to the aircraft's body and relative to the flight path of the aircraft over the ground. Also, the aircraft can rotate around its yaw axis due to control inputs so that the body of the aircraft is no longer aligned with the flight path of the aircraft. Misalignment of airflow over an aircraft relative to the aircraft's body is known as the angle of sideslip. Excessive angle of sideslip can create serious hazards in the slow speed flight regime. For instance, in the Harrier, if more than a 10° angle of sideslip exists, the aircraft can enter into an uncommanded roll, which can be unrecoverable. To prevent this hazard, the Harrier uses a weathervane-type probe extending into the airflow in front of the cockpit which measures angle of sideslip. The weathervane-type probe aligns with the relative wind, allowing the aircraft to determine angle of sideslip by measuring the difference between the rotational position of the weathervane-type probe and the normal alignment of the body of the aircraft with the airflow. In the Harrier, if the angle of sideslip becomes excessive, a warning is provided to the pilot by a pedal shaker which shakes the rudder pedals. The pilot can also visually monitor the angle of sideslip by observing the amount of angular offset of the weathervane probe. However, the Harrier's weathervane probe is fixed in place even when the Harrier is in normal wing borne flight. This increases the drag of the Harrier at higher speeds.

The Harrier was designed and built before the development of "low observable" or stealth aircraft. Low observable aircraft are designed and built to minimize the reflections of radar energy from the aircraft. To reduce an aircraft's radar signature, the features of the aircraft are designed to align along a certain number of predetermined radar reflection lines, which meet at predetermined angles. This allows a concentration of the radar returns from the aircraft in a selected few number of directions. The Harrier's weathervane probe produces a large radar signature that may, by itself, be in excess of the radar signature generally reflected from an entire low observable aircraft.

To avoid the large reflection signature produced by weathervane probes such as the Harrier's, low observable aircraft such as the B-2 Stealth Bomber measure angle of sideslip with a series of air pressure sensors located along the surface of the aircraft. A computer uses the air pressure measurements to calculate angle of sideslip. However, this method of calculating angle of sideslip is expensive, requires extensive computer processing, and is only accurate for small angles. Thus, this method would not be useful for the slow speed flight regime in which rapid and large changes in angle of sideslip can occur when an aircraft rotates about its yaw axis or is subject to gusts of wind from variable directions.

SUMMARY OF THE INVENTION

Therefore, a need has arisen for an apparatus and method to measure angle of sideslip for low observable aircraft in slow speed flight.

In accordance with the present invention, an apparatus and method are provided that substantially eliminate or reduce disadvantages and problems associated with previously developed probes for measuring airflow past an aircraft. A retractable probe is extended by a support member into an aircraft's airflow and allowed to rotate so that the probe aligns with the relative wind. The probe has an aerodynamically stable configuration which is created by pivoting the probe around an axis located between the front of the probe and the probe's center of pressure. The rotational position of the probe can allow measurement of the angular displacement of the relative wind from the normal airflow over the aircraft. When the support member extends the probe along the yaw axis of the aircraft, the sensor associated with the probe can use the rotational position of the probe to determine the aircraft's angle of sideslip. In normal wing borne flight, the probe can be retracted into the body of the aircraft by a retraction-extension mechanism so that the probe will not produce an undesired radar reflection signal.

More specifically, the present invention provides a tetrahedron-shaped probe having a planform with edges that are parallel to other features of the aircraft so that the radar signature of the planform is minimized. In normal wing borne flight, the probe is fittingly stored in a like-shaped cavity in the body of the aircraft. In the slow speed flight regime, the probe is extended into the airstream by a motor cooperating with a support shaft coupled to the probe. In the airstream, the probe rotates to align with the relative wind, and the rotational position of the probe is measured by an electromechanical sensor to determine the angle of sideslip of the aircraft. This information can be provided to the aircraft's flight control system. The probe can be extended or retracted based on a number of predetermined conditions, such as a manual pilot input, the position of the aircraft's landing gear handle, or the flight conditions of the aircraft.

The present invention provides important technical advantages by allowing simple and accurate computations of angle of sideslip during slow speed flight without creating a significant radar return during normal wing borne flight. The extended probe can measure angle of sideslip for any angular displacement about the entire yaw axis of the aircraft and can also provide visual cues to a pilot. The probe can be retracted during high speed flight not only to reduce the aircraft's radar signature, but to avoid adding drag to the aircraft and to reduce the strength required of the supporting shaft. Retraction of the probe into the body of the aircraft is facilitated by the interaction of the tetrahedron shape of the probe with a cavity having a corresponding tetrahedron shape.

BRIEF DESCRIPTION OF THE DRAWINGS

A more complete understanding of the present invention and advantages thereof may be acquired by referring to the following description taken in conjunction with the accompanying drawings in which like reference numbers indicate like features and wherein.

DETAILED DESCRIPTION OF THE INVENTION

Preferred embodiments of the present invention are illustrated in the figures, like numerals being used to refer to like and corresponding parts of the various drawings.

Modern anti-aircraft weapons include automatically guided munitions which find and track targets based on radar reflections from the intended target. To counter these radar guiding munitions, modern aircraft are designed to be low observable, meaning that they have reduced radar signatures. Aircraft having low observable designs are particularly useful since such low observable aircraft can penetrate enemy airspace without detection. Such aircraft tend to use a variety of measurements of their flight conditions to control their flight throughout their flight envelope. The measurement instruments used in low observable aircraft should also be designed to have minimal radar signatures.

Figure 1:
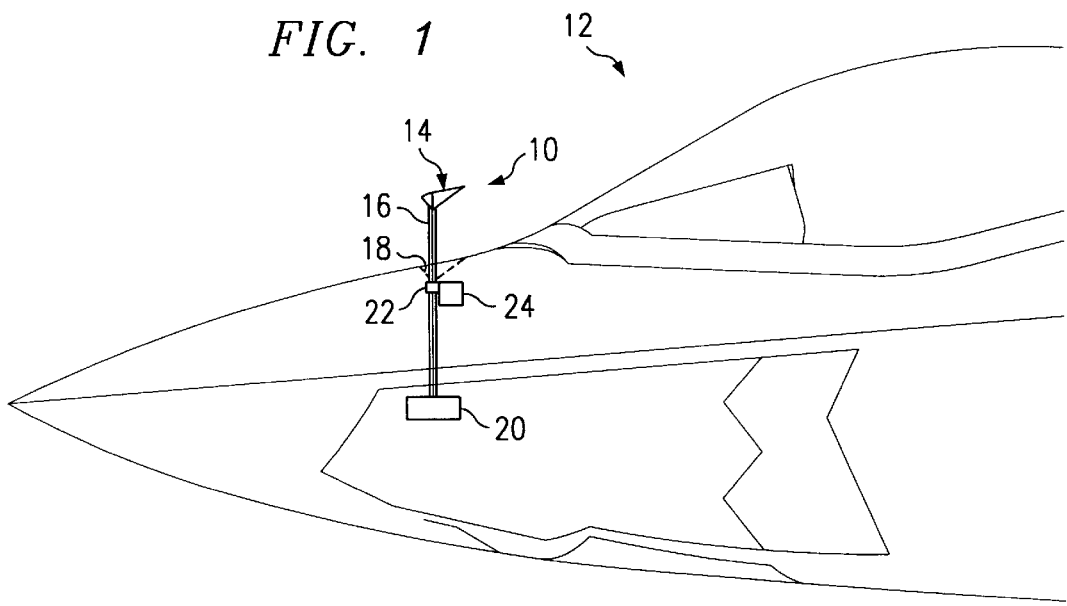
FIG. 1 is a side view of a tetrahedron-shaped probe extending from a low observable aircraft.

Referring now to FIG. 1, an angle of sideslip measuring instrument 10 according to the present invention is incorporated into a low observable aircraft 12 to provide aircraft 12 with input regarding its angle of sideslip, known as $\beta$, through the air. A tetrahedron-shaped, aerodynamically stable probe 14 is coupled to a supporting shaft 16, which acts as a support member to extend probe 14 into the airflow of aircraft 12. A tetrahedron-shaped cavity 18 is formed in aircraft 12 to accept and stow tetrahedron probe 14. Shaft 16 extends through the surface of aircraft 12 and is rotationally coupled to a retraction-extension mechanism 20. Shaft 16 also extends through a slip collar 22 which is operationally coupled to a position sensor 24. Shaft 16 can be made of any acceptable material, including radar-absorbing material, and can be an aerodynamic shape to reduce drag, such as a circular shape, or can have sharp corners to reduce its radar signature. The position sensor 24 can be a variable resistance or rheostat potentiometer-type sensor which provides a direct analog output of the rotational position of probe 14.

Shaft 16 is long enough to extend tetrahedron probe 14 between six and eight inches above the surface of aircraft 12. This allows tetrahedron probe 14 to act as a weathervane-type device by aligning with the relative wind without experiencing interference from the boundary layer of the airflow along aircraft 12. As tetrahedron probe 14 aligns with the relative wind, shaft 16 rotates causing slip collar 22 to also rotate. The amount of rotation of slip collar 22 is measured by a mechanical linkage between slip collar 22 and position sensor 24. Position sensor 24 then translates the rotational position of probe 14 into an electrical signal which can be transmitted to the flight control system of aircraft 12. Retraction-extension mechanism 20 can be any electrical, pneumatic, hydraulic or other system which can act as a motor to raise and lower support shaft 16. In one embodiment, retraction-extension mechanism 20 can be a simple gear drive similar to the systems used to raise and lower car radio antennas.

Figure 2:
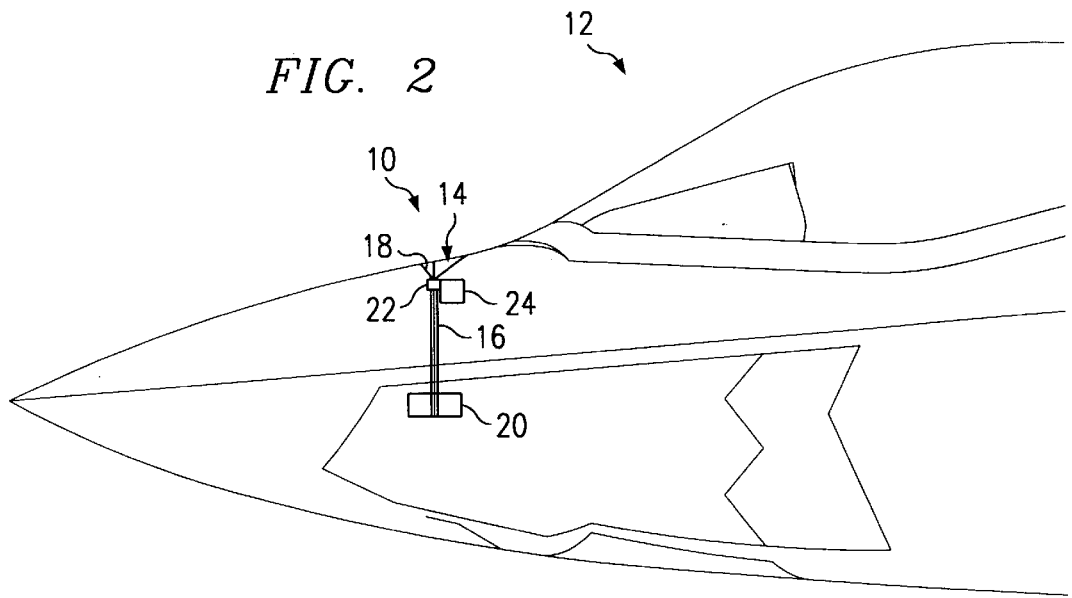
FIG. 2 is a side view of a tetrahedron-shaped probe retracted into the body of a low observable aircraft.

Referring now to FIG. 2, tetrahedron probe 14 is stowed in cavity 18 as it could be during high speed flight. During retraction, tetrahedron probe 14 can be aligned with cavity 18 by mechanical means or can self-align as tetrahedron probe 14 conforms with like-shaped cavity 18.

Figure 3:
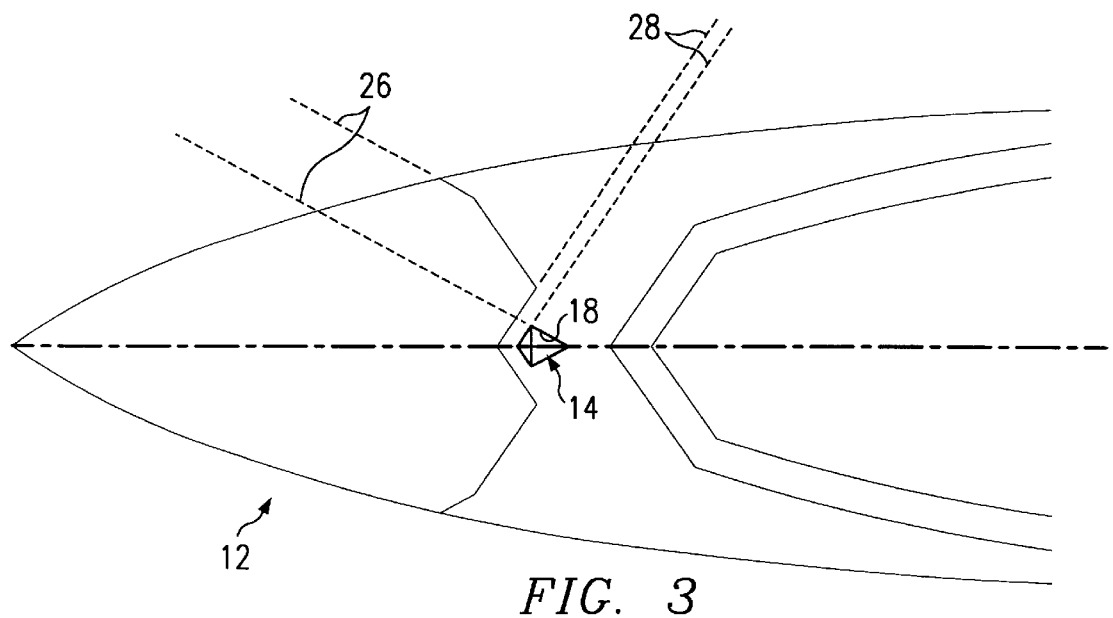
FIG. 3 is a top view of a tetrahedron-shaped probe retracted into the body of an aircraft.

Referring now to FIG. 3, tetrahedron probe 14 is stowed in cavity 18 in a low observable configuration. Low observable aircraft 12 has a number of body parts which are constructed along predetermined radar reflection lines such as parallel lines 26 and 28. The planform edges of tetrahedron probe 14 correspond with parallel lines 26 and 28 so that the probe does not increase the radar signature of aircraft 12.

Figure 4:
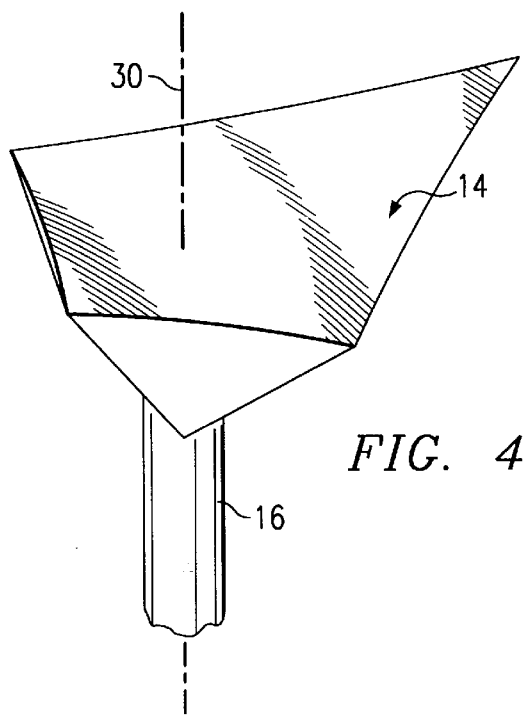
FIG. 4 is a perspective view of a tetrahedron-shaped probe coupled to a supporting shaft.

Referring to FIG. 4, tetrahedron-shaped probe 14 is coupled to supporting shaft 16 at pivot axis 30. Probe 14 and shaft 16 can be constructed of any suitable material, although materials with low radar reflectivity or radar absorbing qualities could help reduce the overall radar signature of aircraft 12. The location of pivot axis 30 ensures that tetrahedron probe 14 will act as an aerodynamically stable weathervane-type device. Pivot axis 30 should be located at a point between the front and the center of pressure of tetrahedron probe 14. In other words, the portion of tetrahedron probe 14 aft of pivot axis 30 has more side projected area than the portion of tetrahedron probe 14 located in front of pivot axis 30, which causes the front of probe 14 to point into the relative wind. In alternative embodiments, probes having other shapes could be used, such as circular, rectangular or conical shapes. To use an alternative probe, shaft 16 should be located in front of the center of pressure of the selected probe.

In operation, as the pilot enters or leaves the slow speed flight regime, retraction-extension mechanism 20 extends or retracts probe 14 into or out of the airflow of aircraft 12 along an axis that is parallel to the yaw axis of the aircraft. Angle of sideslip measuring instrument 10 can commence or cease providing angle of sideslip information upon receiving a manual command from the pilot or upon determining the existence of another predetermined condition. Any of a number of predetermined conditions can initiate the extension or retraction of probe 14, including a particular airspeed, a particular angle of attack, the position of the landing gear, the position of the landing gear handle, or any other condition that indicates the aircraft is entering a slow speed flight regime. Similarly, any of a number of operational predetermined conditions can initiate retraction or extension of probe 14. For instance, the retraction-extension mechanism 20 can retract probe 14 if the aircraft's radar warning receiver or other electromagnetic warfare device detects radar scanning by an enemy detection or weapon device. The aircraft's flight control computer can test for a set of predetermined conditions for extension and a set for retraction, and can direct retraction-extension mechanism 20 as appropriate.

In the slow speed fight regime, aerodynamically stable probe 14 aligns with the relative wind across the aircraft when probe 14 is extended into the airstream, causing support shaft 16 to rotate. Position sensor 24 can measure the direction of the airflow across aircraft 12 by measuring the rotational position of support shaft 16 and comparing the measured direction with the direction of airflow normally experienced across aircraft 12, which allows a determination of angle of sideslip. In alternative embodiments, any sensor capable of measuring the rotational position of probe 14 can be used. The sensor can be associated directly with probe 14, or can be indirectly associated through the translation of movement of probe 14 by support shaft 16. For instance, in one alternative embodiment, probe 14 can be rotationally coupled to supporting shaft 16, so that the probe can align with the relative wind, but supporting shaft 16 remains in a constant position. In this embodiment, sensor 24 could actually be located within the body of probe 14. In other embodiments, position sensor 24 can be located at any convenient location, including within retraction-extension mechanism 20. Further, probe 14 can be aligned with an axis other than the yaw axis to also measure airflow in other directions, such as the angle of attack.

Figure 5:
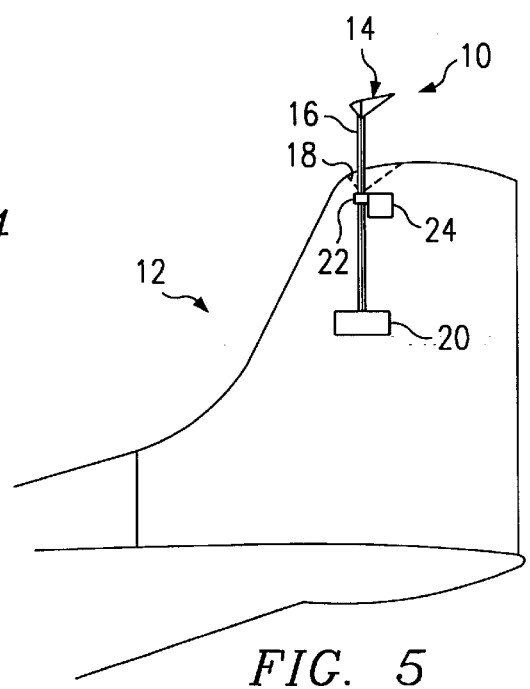
FIG. 5 is a side view of a probe configured in an aircraft tail.

In one embodiment, probe 14 can be painted a bright color and placed in front of the cockpit to provide visual indications of angle of sideslip to the pilot. When the probe is located in the visual range of the pilot, it can also give the pilot a visual indication that the predetermined condition, such as the position of the gear or the amount of angle of attack, has been met. In other embodiments, probe 14 can be relocated to any spot on aircraft 12 where the relative wind can be detected without interference from the boundary layer around aircraft 12. For instance, probe 14 could extend from the landing gear, extend from other portions on the bottom of the aircraft, extend from the wing, or extend from the tail as depicted in FIG. 5. In these embodiments, the angle of sideslip detected by probe 14 would be automatically forwarded to a flight control system to manage the flight of aircraft 12 throughout the slow speed flight regime.

As aircraft 12 leaves the slow speed flight regime and enters normal wing borne flight, retraction-extension mechanism 20 retracts probe 14 into the body of aircraft 12. In one embodiment, the aircraft has a cavity 18, which is the same shape as the probe 14 and which accepts the probe as it is retracted into the aircraft. At normal flying speeds, angle of sideslip is generally minimal, so the probe should naturally align with the cavity. However, the tetrahedron shape of probe 14 and the accompanying tetrahedron shape of cavity 18 assists the probe's alignment as it enters cavity 18. In another embodiment, a mechanism can be included to align the probe during retraction. Such a mechanism would be helpful if, for instance, the probe is retracted when the aircraft is on the ground because the probe would align with the prevailing wind in the absence of airflow along the aircraft's flight path. In other embodiments, the probe can be completely stowed within the body of aircraft 12 by any convenient means so as to minimize radar reflections.

The present invention provides a number of technical advantages, whether or not it is incorporated in a low observable aircraft. For instance, a retracted probe does not cause unnecessary drag. A retracted probe is not subject to the excessive aerodynamic forces which can be produced at high speeds, and thus does not have to be constructed to be as sturdy as a probe that always remains in the airflow of the aircraft. In addition to having a reduced radar signature, the tetrahedron shape of the probe allows self-alignment during retraction. Further, the probe provides accurate and simple measurements of angle of sideslip in the slow speed flight regime, as well as visual indications to the pilot of angle of sideslip.

Although the present invention has been described in detail, it should be understood that various changes, substitutions and alterations can be made hereto without departing from the spirit and scope of the invention as defined by the appended claims.

What is claimed is:

1. An apparatus for measuring airflow past an aircraft, the apparatus comprising:
   a probe having a front and a center of pressure;
   a support member coupled to the probe between the front and the center of pressure;
   a retraction-extension mechanism located in the aircraft, the mechanism cooperating with the support member to extend the probe into the airflow so that the probe can rotate to align with the airflow, and to retract the probe into the aircraft.

2. The apparatus according to claim 1 further comprising a sensor associated with the probe for measuring the probe's rotational position.

3. The apparatus according to claim 2 wherein the probe rotates about the yaw axis of the aircraft and wherein the sensor measures angle of sideslip.

4. The apparatus according to claim 3 wherein the probe is located in front of the cockpit of the aircraft so that the aircraft's pilot can use the probe as a visual indicator of angle of sideslip.

5. The apparatus according to claim 3 wherein the probe has a tetrahedron shape.

6. The apparatus according to claim 5 wherein the aircraft has a tetrahedron-shaped cavity and wherein the probe is fittingly stored in the cavity.

7. The apparatus according to claim 1 wherein the retraction-extension mechanism extends or retracts the probe according to at least one predetermined condition.

8. The apparatus according to claim 7 wherein the predetermined condition comprises the position of the aircraft's gear.

9. The apparatus according to claim 7 wherein the predetermined condition comprises a predetermined angle of attack for the aircraft.

10. The apparatus according to claim 7 wherein the predetermined condition comprises signals from a radar warning receiver.

11. An apparatus for measuring airflow to determine angle of sideslip for a low observable aircraft, the apparatus comprising:

a tetrahedron-shaped probe rotationally coupled to the aircraft, the probe extending into the airflow; and a sensor associated with the probe for measuring the rotational position of the probe to determine the aircraft's angle of sideslip.

12. The apparatus according to claim 11 further comprising a retraction-extension mechanism cooperating with the probe for retracting the probe into the aircraft and extending the probe into the airflow.

13. The apparatus according to claim 12 wherein the probe is located in the tail of the aircraft.

14. The apparatus according to claim 11 wherein the low observable aircraft is built with predetermined radar reflection lines and wherein the tetrahedron probe has a planform with edges corresponding to the predetermined reflection lines.

15. A method for measuring airflow past an aircraft, the method comprising the steps of:

testing for a first set of at least one predetermined condition;

extending an aerodynamically-stable probe into the airflow if the first set of at least one predetermined conditions exists; and measuring the direction of the airflow past the aircraft by determining the rotational position of the probe.

16. The method according to claim 15 further comprising the steps of:

testing for a second set of at least one predetermined condition; and retracting the probe if the second set of at least one predetermined conditions exists.

17. The apparatus according to claim 16 wherein the aircraft is a low observable aircraft having predetermined radar reflection lines and wherein the probe has a planform with edges, the edges corresponding to the predetermined reflection lines.

18. The method according to claim 16 wherein the at least one predetermined condition comprises the aircraft's airspeed.

19. The method according to claim 16 wherein the aircraft is a low observable aircraft and wherein the second set of at least one predetermined condition comprises the detection of radar scanning.

20. The method according to claim 19 wherein the at least one predetermined condition comprises the position of the aircraft's landing gear handle.

* * * * *